(12) United States Patent
Yadav et al.

(10) Patent No.: US 11,724,222 B2
(45) Date of Patent: Aug. 15, 2023

(54) COMPACT VEHICLE FILTER HEAD

(71) Applicant: Deere & Company, Moline, IL (US)

(72) Inventors: Arvind Yadav, Pune (IN); Jeffrey A. Buttjer, Waverly, IA (US)

(73) Assignee: Deere & Company, Moline, IL (US)

( * ) Notice: Subject to any disclaimer, the term of this patent is extended or adjusted under 35 U.S.C. 154(b) by 299 days.

(21) Appl. No.: 17/182,573

(22) Filed: Feb. 23, 2021

(65) Prior Publication Data

US 2022/0266179 A1 Aug. 25, 2022

(51) Int. Cl.
| | | |
|---|---|---|
| *B01D 35/30* | (2006.01) | |
| *F01M 11/03* | (2006.01) | |
| *F16H 57/04* | (2010.01) | |
| *F16L 41/03* | (2006.01) | |
| *B01D 35/147* | (2006.01) | |
| *B01D 35/00* | (2006.01) | |
| *B01D 29/52* | (2006.01) | |
| *F02M 37/32* | (2019.01) | |

(52) U.S. Cl.
CPC ............ *B01D 35/301* (2013.01); *B01D 29/52* (2013.01); *B01D 35/005* (2013.01); *B01D 35/147* (2013.01); *F01M 11/03* (2013.01); *F16H 57/0402* (2013.01); *F16L 41/03* (2013.01); *B01D 2201/303* (2013.01); *B01D 2201/304* (2013.01); *F01M 2011/031* (2013.01); *F02M 37/32* (2019.01)

(58) Field of Classification Search
CPC .... B01D 35/147; B01D 35/005; B01D 29/52; B01D 35/0301
See application file for complete search history.

(56) References Cited

PUBLICATIONS

Speedway, "Dual Horizontal Remote Oil Filter Bract", Sep. 16, 2015, https://web.archive.org/web/20150916034013/https://www.speedwaymotors.com/Dual-Horizontal-Remote-Oil-Filter-Bracket,1162.html (Year: 2015).*

* cited by examiner

*Primary Examiner* — Kevin A Lathers
(74) *Attorney, Agent, or Firm* — Tucker Ellis LLP; Michael G. Craig; Heather M. Barnes (57) ABSTRACT

One or more techniques and/or systems are disclosed for a vehicle fluid filter head. The filter head can be attached to two or more filters to filter vehicle fluid, and provide a variety of optional arrangements for coupling inlet and outlet hoses. A plurality of inlets and outlets can be disposed on the filter head at different sides of the filter head. A pair of filter headers can be disposed on a first side to receive filter. A first inlet and outlet can be disposed on a second side, and a second inlet and outlet can be disposed on a third side. Respective inlet are fluidly coupled with an inlet passage in the head, which is fluidly coupled with an intake portion of the filter headers. Respective outlets are fluidly coupled with an outlet passage in the head, which is fluidly coupled with an outflow portion of the filter headers.

18 Claims, 10 Drawing Sheets

COMPACT VEHICLE FILTER HEAD

BACKGROUND

Vehicles use a variety of fluids to operate, such as engine oil, transmission fluid, cooling fluid, hydraulic fluid, and fuel. Typically, these fluids are operably filtered in order to remove unwanted contaminants that may hinder performance. As an example, a fluid filter can be operably mounted on a filter head that is fastened to the vehicle, such as in the engine compartment. Some larger vehicles, such as construction and agricultural vehicles (e.g., tractors) will utilize multiple filters for a vehicle fluid. In these situations, multiple filter heads may need to be mounted in the vehicle, and multiple fluid lines may need to be run through/around the vehicle to accommodate the multiple filter heads.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter. that can operably couple wit One or more techniques and systems are described herein for a filter head that can be operably coupled with two or more filters to filter vehicle fluid. The example head can provide a variety of optional arrangements for coupling inlet and outlet hoses. That is, a plurality of inlets and outlets can be disposed on the filter head, for example, at different sides of the filter head. The respective inlets can be fluidly coupled with an intake portion of the filter headers attached to the filters. The respective outlets can be fluidly coupled with an outflow portion of the filter headers. In this way, the location of the coupling of the inlet hose and outlet hose can be determined based on the target location in the target vehicle.

In one implementation of a vehicle fluid filter head, the filter head can comprise a body. Further, two filter headers can be disposed on a first side of the body. Here, respective filter headers comprise an intake portion that is fluidly coupled with an inlet passage inside the body, and an outflow portion that is fluidly coupled with an outlet passage inside the body. The respective filter headers are sized to operably engage with a fluid filter. A first inlet is fluidly coupled with the inlet passage, and a first outlet is fluidly coupled with the outlet passage. The first inlet and first outlet are respectively disposed on a second side of the body, where the second side is orthogonal to the first side. A second inlet is fluidly coupled with the inlet passage, and a second outlet is fluidly coupled with the outlet passage. The second inlet and second outlet are respectively disposed on a third side of the body, where the third side is orthogonal to the first side.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A vehicle fluid filter header can be devised that operably enables at least two filters to be attached in a more compact design, and provides for a variety of fluid inlet and outlet configurations. In this way, where a vehicle may utilize more than one filter for a particular fluid, such as engine oil, hydraulic fluid, fuel, etc., merely one filter head may be utilized. In some implementations, the use of one filter head for two or more filters can reduce the space needed to house the filter system. That is, for example, typical and existing filter heads merely hold a single filter. Housing two separate filter heads and filters in a limited space, such as in an engine compartment area, can take up more room that a single, compact head that receives two filters. Further, in some implementations, the filter head described herein can have multiple options for attaching the fluid inlet and outlets, such as at more than one side of the head. In this way, for example, options for running fluid lines are increased, which can lead to a more efficient and compact design.

Figure 1:
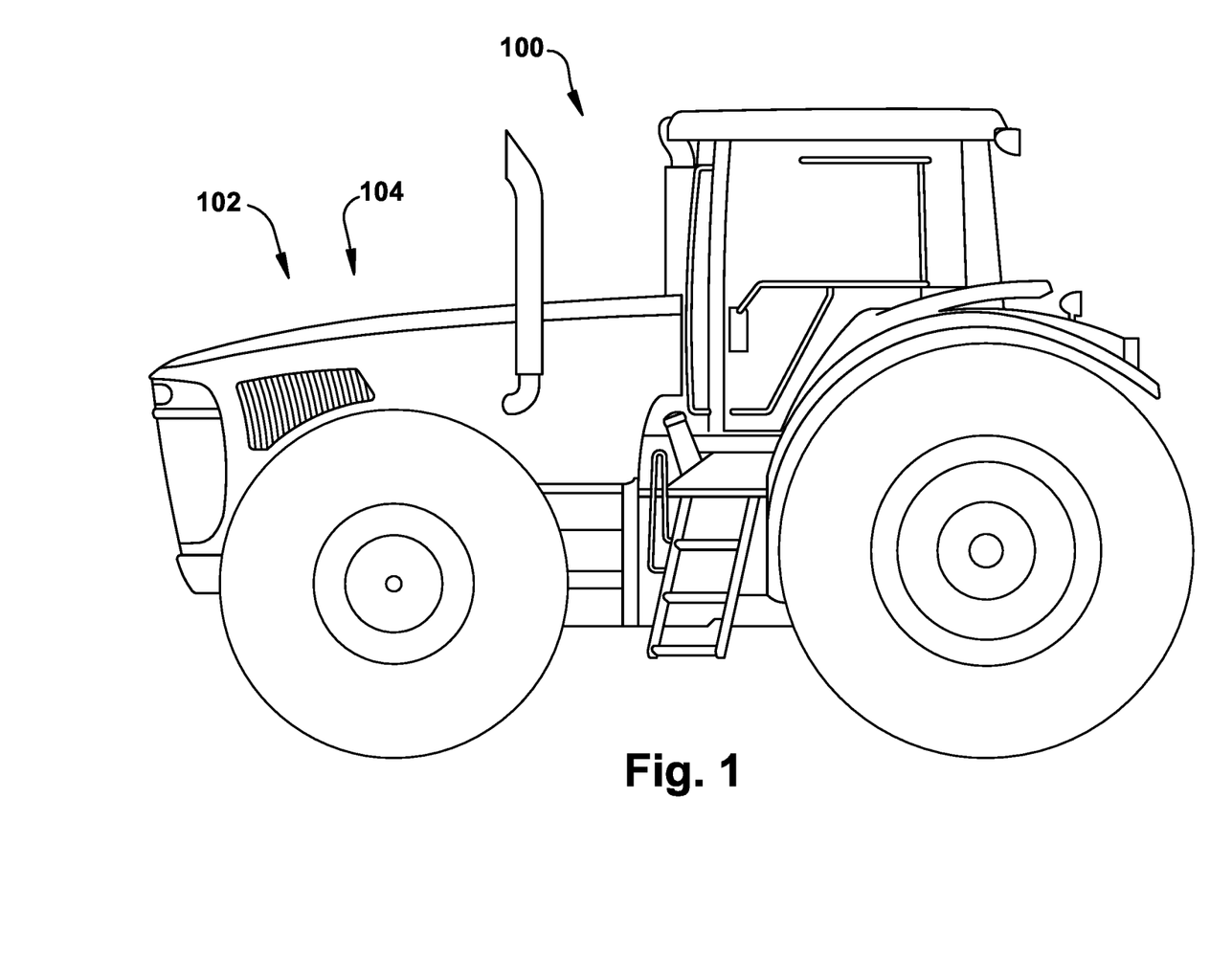
FIG. 1 is a component diagram illustrating an example vehicle where one or more portions of one or more systems described herein may be implemented.

FIG. 1 is a component diagram illustrating an example vehicle 100 where one or more devices and systems described herein may be utilized. In this example, an agricultural or construction vehicle 100, such as a tractor, hauler, or the like, can be powered by an engine 102. In this example, the engine 102 may utilize certain vehicle fluids, such as engine oil, cooling fluid, fuel, and/or transmission fluid. Further, some vehicles may utilize systems that use hydraulic fluid to power a hydraulic device or system. In these example, a fluid delivery system 104 can comprise fluid lines, a manifold, a fluid cooler, a fluid pump, a fluid reservoir, amongst other things, and one or more fluid filters for filtering undesired contaminants from the fluid system.

Figure 2A:
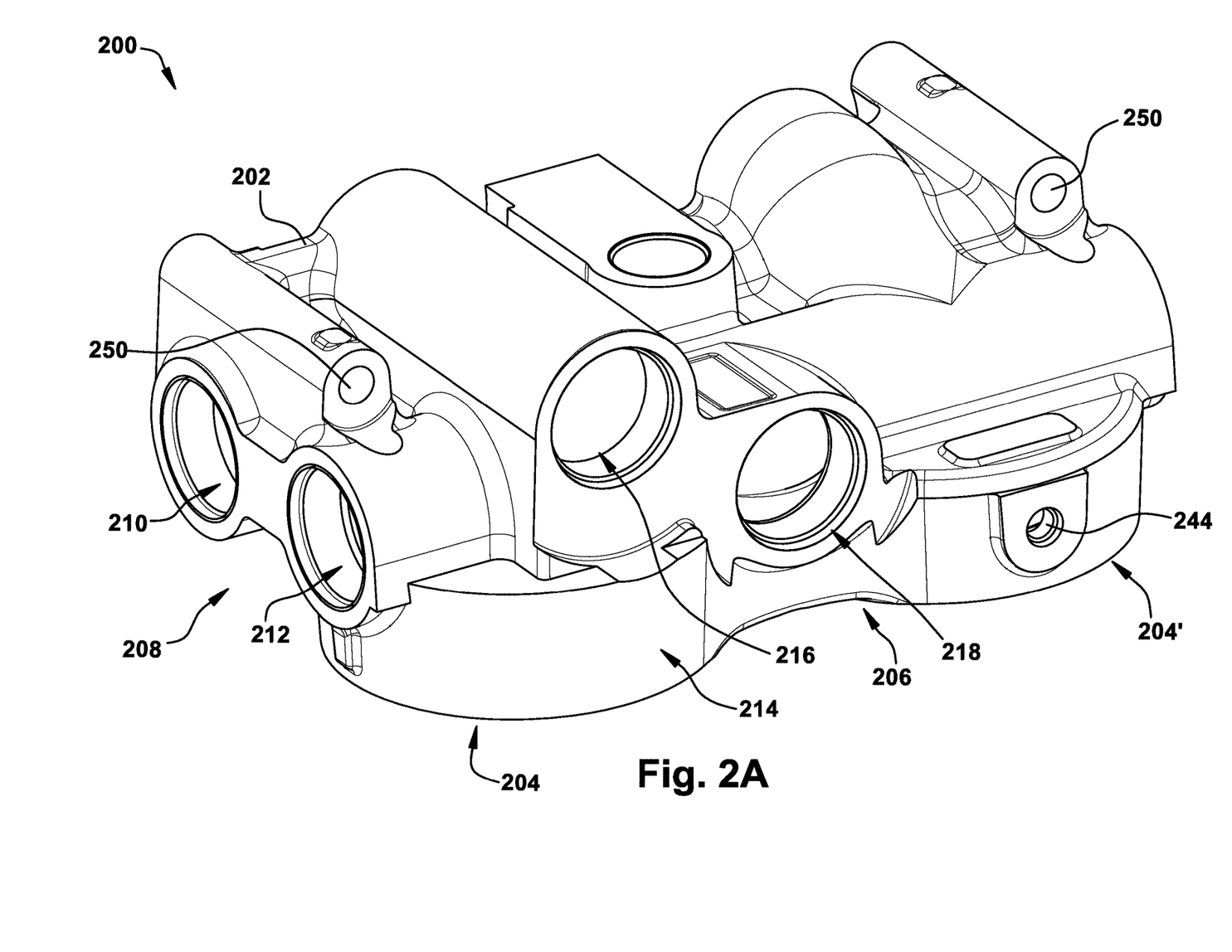
FIGS. 2A, 2B and 2C are component diagrams illustrating various views of one implementation of a vehicle fluid filter head as described herein.
Figure 2B:
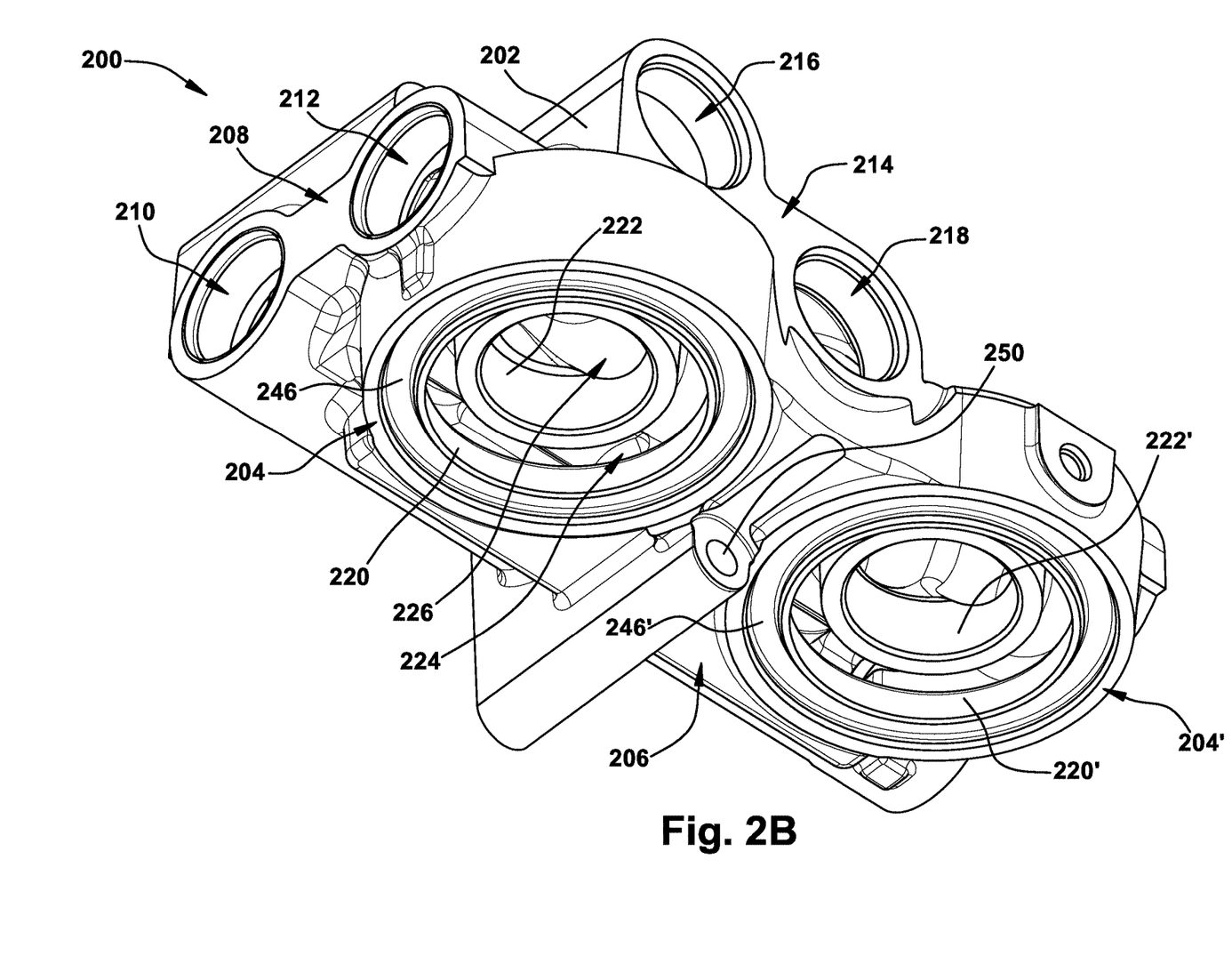

FIG. 2A is a component diagram illustrating a front, top perspective view of one implementation of an example filter head 200, as described herein; and FIG. 2B is a component diagram illustrating a front, bottom perspective view of one implementation of an example filter head 200, as described herein. In this example, the filter head 200 comprises a body 202, which forms the filter head and parts thereof. In some implementations the body 202 may be of a unitary design, wherein the body is comprised on a single unit. In this implementation, the body may be formed by casting, milling, shaping, or combinations thereof. Further, the body may be formed of an appropriate material, such as metal (e.g., alloys, steel, aluminum, etc.), polymer, carbon and/or glass fiber combined with resin, which has been selected using sound engineering principles for its intended use. As an example, a system using a heated fluid that is used under pressure may utilize a metal material; while a system using a cooler fluid may utilize a polymer or other material for the body 202. In other implementations, the body 202 may be comprised of two or more components that are fastened together, such as by welding, gluing, soldering, combining with resin, with the use of fasteners, etc. In this implementation, the respective components can be separately formed, and may comprise one or more different materials.

Figure 2C:
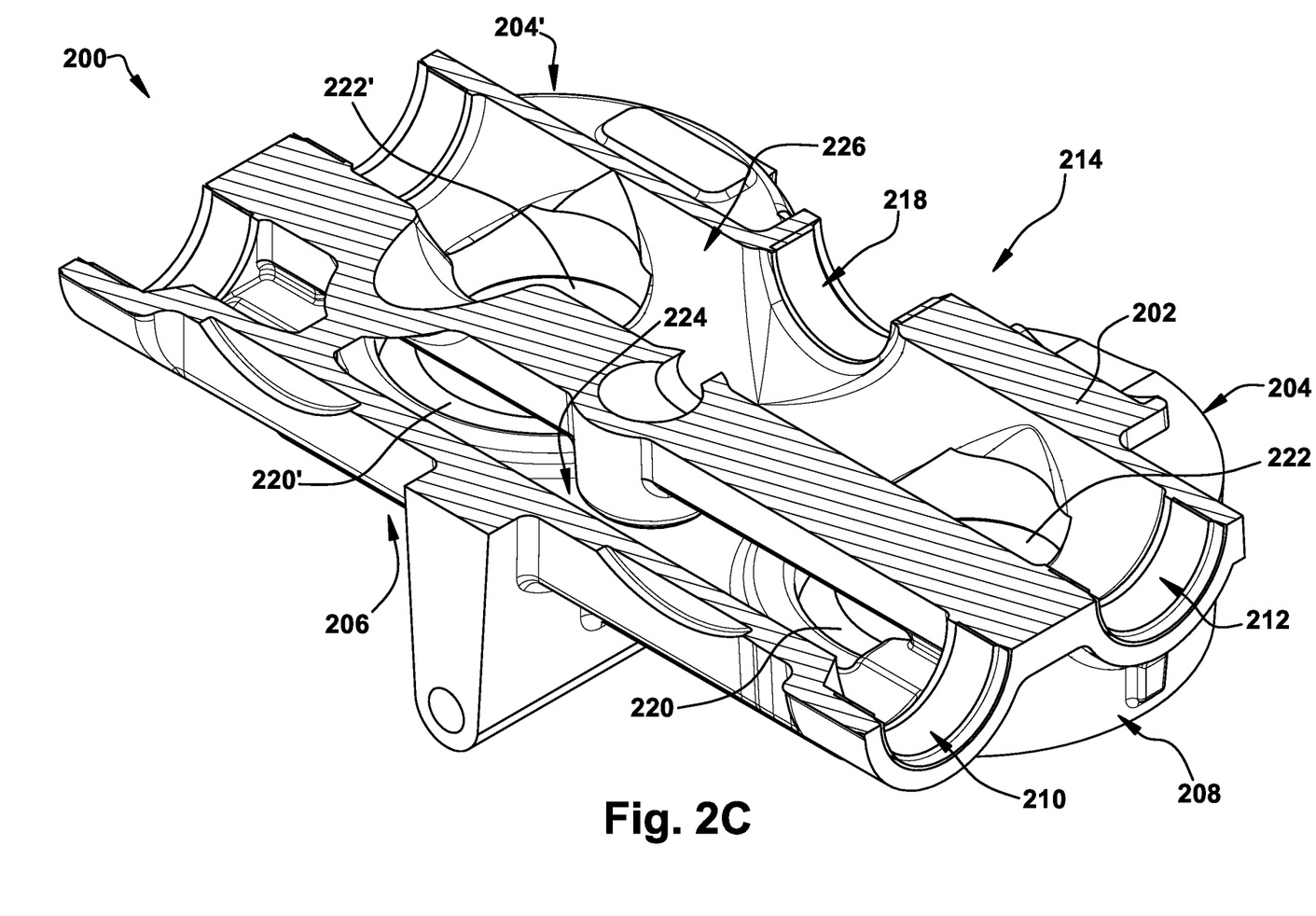

With continued reference to FIGS. 2A and 2B, FIG. 2C is a component diagram illustrating a rear, top perspective view of a cut-away portion of an implementation of an example filter head 200, as described herein. In this implementation, the filter head 200 comprises at least two filter headers 204, 204' respectively disposed on a first side 206 of the body 202. Further, the respective filter headers 204, 204' comprise an intake portion 220, 220' fluidly coupled with an inlet passage 224 inside the body 202. The respective filter headers 204, 204' also comprise an outflow portion 222, 222' fluidly coupled with an outlet passage 226 inside the body 202. Additionally, the respective filter headers 204, 204' are sized to operably engage with a fluid filter (not shown). In some implementations, the respective filter headers 204, 204' can comprise a channel 246, 246' that is sized to operably receive a gasket (not shown) that is coupled with the fluid filter, for example, to mitigate leakage of the vehicle fluid.

As illustrated in FIGS. 2A, 2B, and 2C, the vehicle fluid filter head 200 comprises a first inlet 210 that is fluidly coupled with the inlet passage 224. The filter head 200 also comprises a first outlet 212 that is fluidly coupled with the outlet passage 226. In this implementation, the first inlet 210 and first outlet are respectively disposed on a second side 208 of the body 202. Further, the second side 208 is disposed orthogonal to the first side 206. That is, for example, a plane formed by the first side 206 is substantially orthogonally disposed to a plane formed by the second side 208.

As illustrated, the first inlet 210 can provide for fluid flow into the body 202 in the inlet passage 224. Additionally, the inlet passage 224 is fluidly coupled with the respective intake portions 220, 220' of the filter head 200. As such, in this example, the first inlet 210 is fluidly coupled with the respective intake portions 220, 220' of the filter head 200, for example, to provide a flow of fluid from outside the head 200 at the second side 208, to filters (not shown) attached to the filter headers 204, 204'. Further, as illustrated, the outlet passage 226 is fluidly coupled with the respective outflow portions 222, 222' of the filter headers 204, 204'. As such, in this example, the first outlet 212 is fluidly coupled with the respective outflow portions 222, 222' of the filter headers 204, 204', for example, to provide a flow of fluid from outside the head 200 at the second side 208, to filters (not shown) attached to the filter headers 204, 204'.

As illustrated in FIGS. 2A, 2B, and 2C, the vehicle fluid filter head 200 comprises a second inlet 216 that is fluidly coupled with the inlet passage 224. Further, the filter head 200 comprises a second outlet 218 that is fluidly coupled with the outlet passage 226. In this implementation, the second inlet 216 and the second outlet 218 are respectively disposed on a third side 214 of the body 202. The third side 214 of the body 202 is disposed orthogonally to the first side 206. That is, for example, a plane formed by the first side 206 is orthogonally disposed to a plane formed by the third side 214.

As illustrated, the second inlet 216 can provide for fluid flow into the body 202 in the inlet passage 224. Additionally, as described above, the inlet passage 224 is fluidly coupled with the respective intake portions 220, 220' of the filter head 200. As such, in this example, the second inlet 210 is fluidly coupled with the respective intake portions 220, 220' of the filter headers 204, 204', for example, to provide a flow of fluid from outside the head 200 at the third side 214, to filters (not shown) attached to the filter headers 204, 204'. Further, as described above, the outlet passage 226 is fluidly coupled with the respective outflow portions 222, 222' of the filter headers 204, 204'. As such, in this example, the second outlet 218 is fluidly coupled with the respective outflow portions 222, 222' of the filter headers 204, 204', for example, to provide a flow of fluid from outside the head 200 at the third side 214 to filters (not shown) attached to the filter headers 204, 204'.

Figure 3:
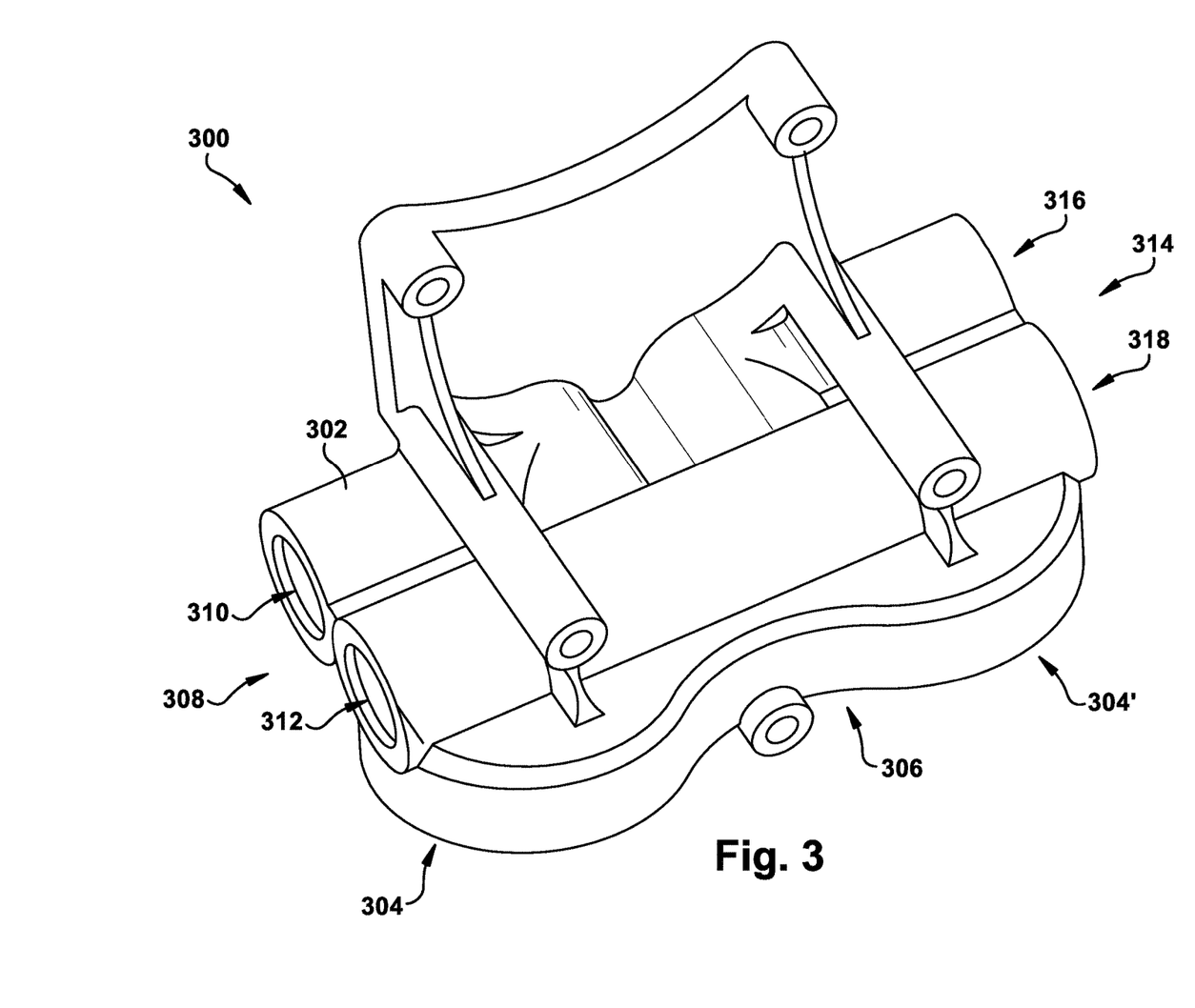
FIG. 3 is a component diagram illustrating an alternate implementation of an example filter header as described herein.

FIG. 3 is a component diagram illustrating a top, front perspective view of an alternate implementation of a vehicle fluid filter head 300. In this implementation, the alternate filter head comprises a body 302, and at least two filter headers 304, 304' disposed on a first side 306 of the body 302. Further, a first inlet 310 and first outlet 312 are disposed on a second side 308; and a second inlet 316, and second outlet 318 are disposed on a third side 314. As illustrated, in this implementation, the second side 308 is disposed orthogonally to the first side 306, and the third side 314 is disposed orthogonally to the first side 306. In this implementation, the second side 308 is opposing to the third side 314. That is, a plane formed by the first side 308 is disposed parallel to a plane formed by the third side 314.

As illustrated in FIGS. 2A and 2B, the second side 208 and third side 214 are disposed substantially orthogonally to each other, as well as to the first side 206. FIG. 3 illustrates and alternate arrangement where the respective sides are opposing each other. It should be appreciated that the arrangement of the sides that house the respective pairs of inlets and outlets can be adjusted to suit the needs of the particular installation (e.g., in a vehicle) of the head 200, 300.

With continued reference to FIGS. 2A, 2B and 2C, FIG. 4 is a component diagram illustrating a rear, top perspective of one implementation of an example filter head 200, as described herein. In this implementation, the filter head 200 can comprise a third inlet 430 that is fluidly coupled with the inlet passage 224. Further, the filter head 200 can comprise a third outlet 432 that is fluidly coupled with the outlet passage 226. In this implementation, the third inlet 430 and the third outlet 432 are respectively disposed on a fourth side 428 of the body 202. As illustrated, the fourth side 428 is disposed orthogonally to the first side 206; and the fourth side 428 is disposed opposing the second side 208. Similarly, as described above, in this implementation, because the inlet passage 224 is fluidly coupled with the intake portions 220, 220' of the respective filter headers 204, 204', the third inlet 430 is fluidly coupled with the intake portions 220, 220' of the respective filter headers 204, 204', for example, to operably provide fluid to an attached filter (not shown). Additionally, because the outlet passage 226 is fluidly coupled with the outflow portions 222, 222' of the respective filter headers 204, 204', the third outlet 432 is fluidly coupled with the outflow portions 222, 222' of the respective filter headers 204, 204', for example, to operably provide for fluid out from the attached filter.

Figure 4:
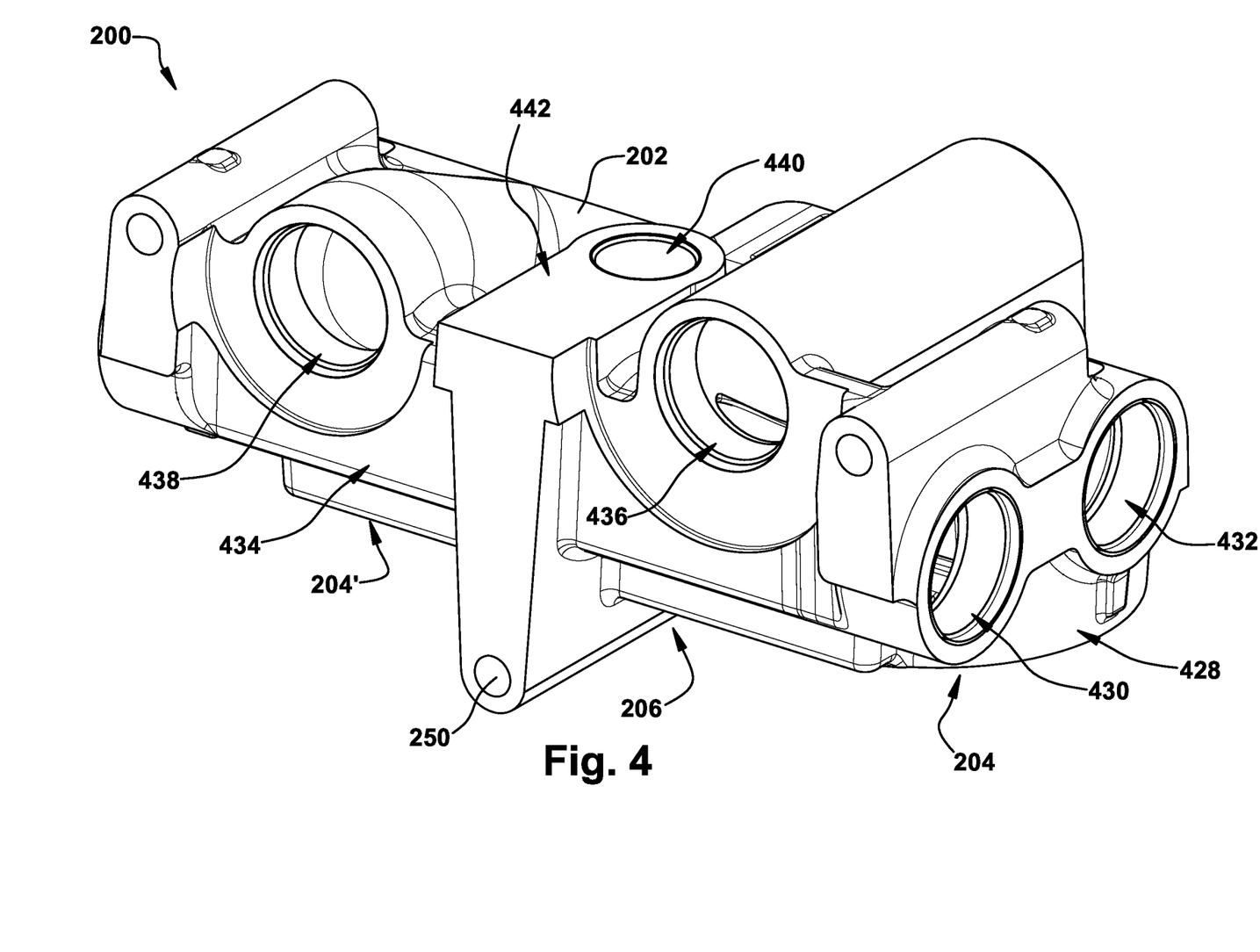
FIG. 4 is a component diagram illustrating one implementation of one or more portions of one or more systems described herein.

Further, in some implementations, the example filter head 200 can comprise a fourth inlet 436 that is fluidly coupled with the inlet passage 224. Further, the filter head 200 can comprise a fourth outlet 438 that is fluidly coupled with the outlet passage 226. In this implementation, the fourth inlet 436 and the fourth outlet 438 are respectively disposed on a fifth side 434 of the body 202. As illustrated, the fifth side 434 is disposed substantially orthogonally to the first side 206; and the fifth side 434 is disposed opposing the third side 214. Because the inlet passage 224 is fluidly coupled with the intake portions 220, 220' of the respective filter headers 204, 204', the fourth inlet 436 is fluidly coupled with the intake portions 220, 220' of the respective filter headers 204, 204', for example, to operably provide fluid to an attached filter (not shown). Additionally, because the outlet passage 226 is fluidly coupled with the outflow portions 222, 222' of the respective filter headers 204, 204', the fourth outlet 438 is fluidly coupled with the outflow portions 222, 222' of the respective filter headers 204, 204', for example, to operably provide for fluid out from the attached filter.

Figure 5:
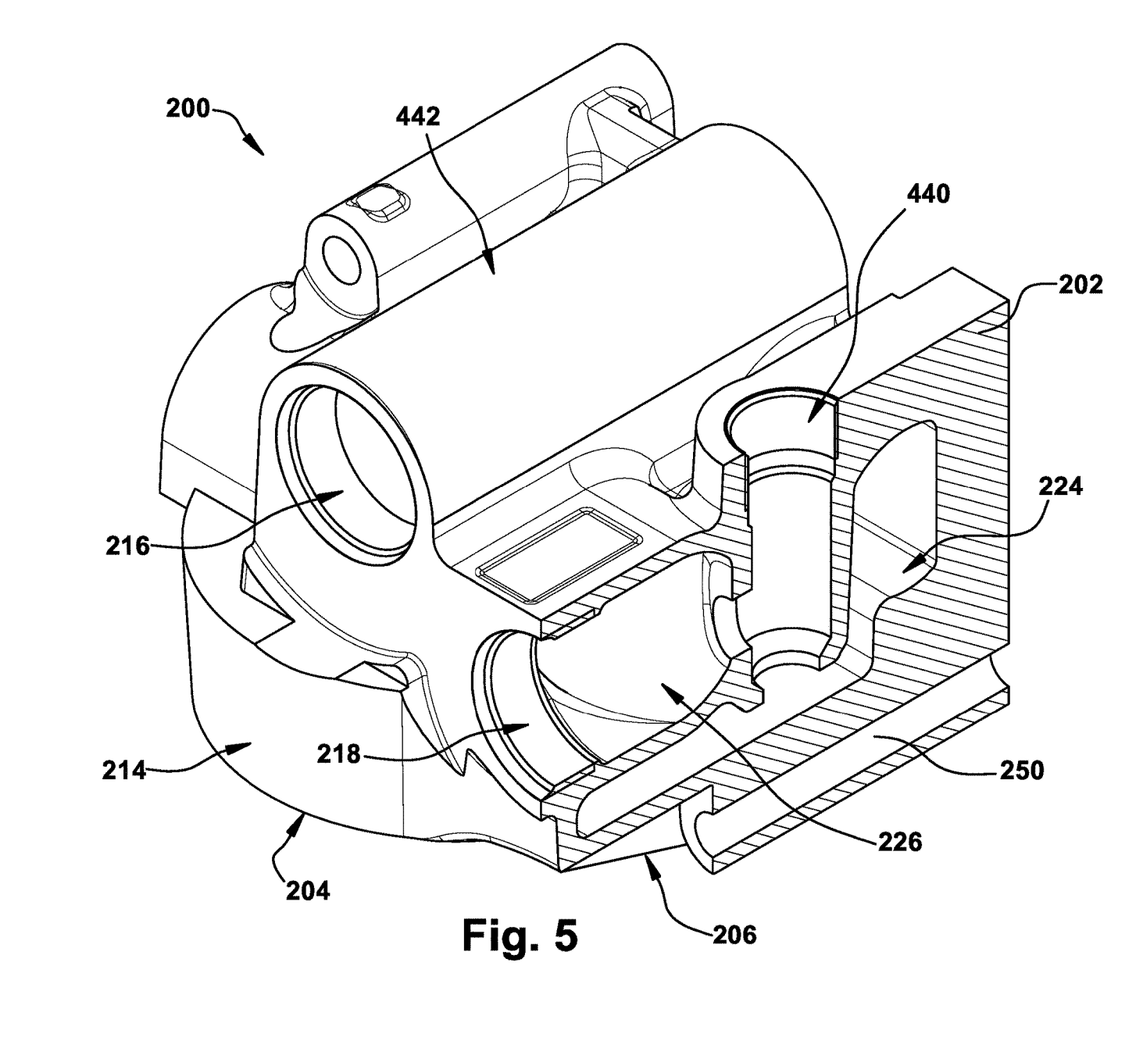
FIGS. 5 and 6 are component diagrams illustrating sectional view s of one or more portions of one or more systems described herein.
Figure 6:
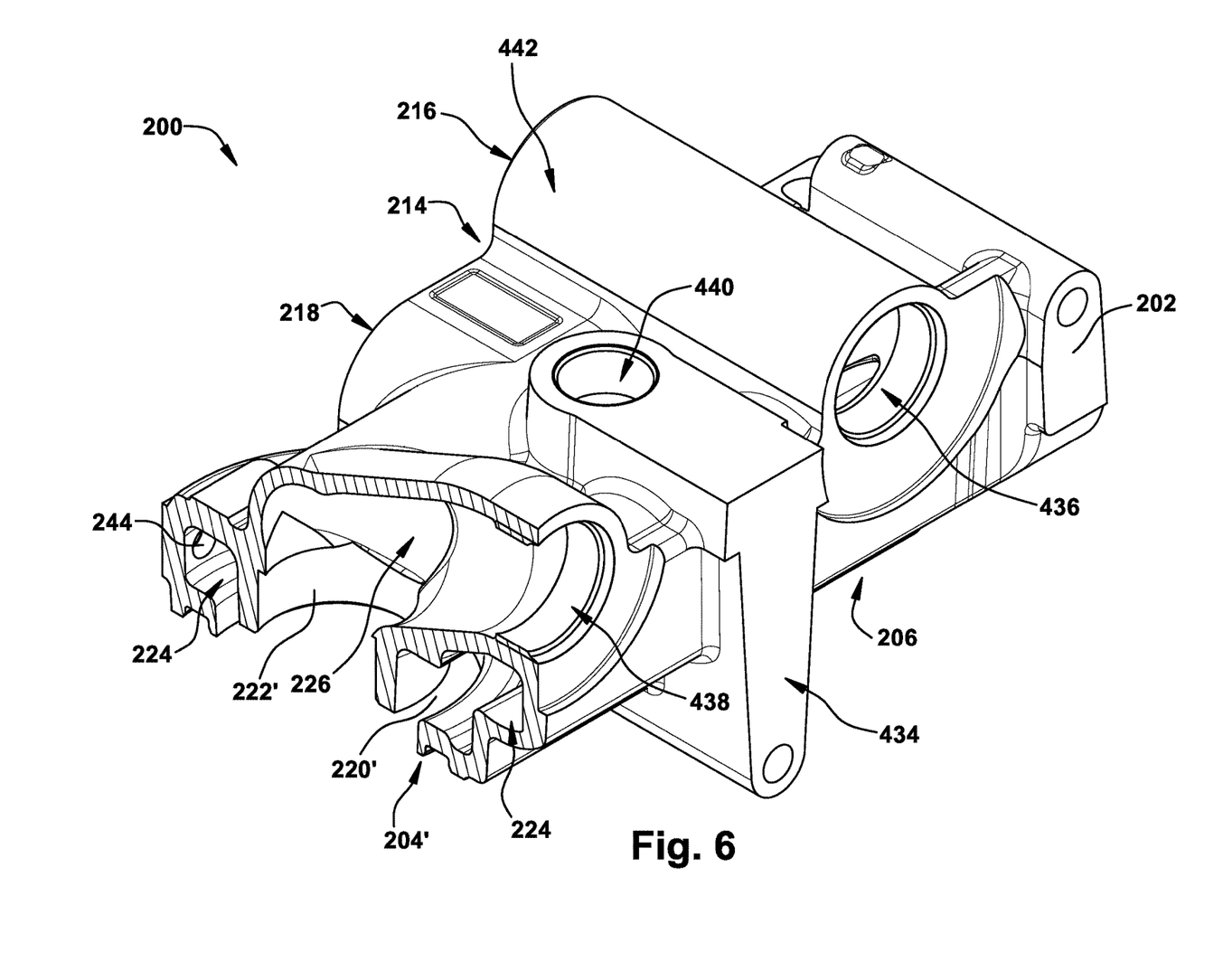

FIGS. 5 and 6 are component diagrams that illustrate partial section views of the example filter head 200. FIG. 5 illustrates a top (e.g., sixth side 442), front (e.g., third side 214) sectional view through an approximate center of the filter head 200, through the second outlet 218. As illustrated, the second outlet 218 is fluid coupled with the outlet passage 226 inside the body 202 of the filter head 200. In this implementation, the outlet passage 226 is disposed in a front portion of the body 202. FIG. 6 illustrates a top (e.g., sixth side 442), rear (e.g., fifth side 434), section view through the right side of the body 202, through the fourth outlet 438. In this implementation, the fourth outlet 438 is fluidly coupled with the outlet passage 226. Further, as illustrated, the outlet passage 226 is fluidly coupled with the outflow portion 222, 222' of the filter header 204, 204'.

As illustrated in FIGS. 5 and 6, in this implementation, the inlet passage 224 is disposed at a rear of the filter head 200, inside the body 202. In this implementation, a portion of the inlet passage 224 is disposed beneath the outlet passage 226, and in fluid communication with the intake portion 220, 220' of the filter header 204, 204'. In this way, the vehicle fluid can flow into one of the plurality of inlets 210, 216, 430, 436, to the inlet passage 224, and into an attached filter through the intake portion 220, 220' of the filter header 204, 204'. As an example, once in the filter, the fluid can move through the filter to the outflow portion 222, 222' of the filter header 204, 204'. In this example, the filtered fluid flows into the outlet passage 226, and to one or more of the plurality of the fluid outlets 212, 218, 432, 438. In this way, there are a plurality of options for attaching an inlet hose and an outlet hose to filter the fluid through dual filters.

Further, in this implementation, with continued reference to FIGS. 2A-2C, and 4 a bypass port bypass port 440 is disposed on a sixth side 442 (e.g., top) of the body 202 of the filter head 200, where the sixth side is opposing to the first side 206 (e.g., bottom). The bypass port 440 forms an opening in the body 202 on the sixth side 442, and is fluidly coupled with both the inlet passage 224 and the outlet passage 226. In this way, for example, fluid flow can bypass the respective filter headers 204, 204' by flowing through the bypass port 440 from the inlet passage 224 to the outlet passage 226. As an example, when not in use, a plug or valve can be installed in the bypass port 440 to mitigate flow between the inlet passage 224 and outlet passage 226. Additionally, in some implementations, a sample port 244 can be fluidly coupled through the body 202 with the inlet passage 224. In this implementation, the sample port 244 can provide access to the interior of the body 202 from the outside, for example, to collect a sample of the fluid that is flowing through the head 200, such as for testing.

As illustrated, the inlet passage 224 and outlet passage 226 are separated from each other, except by the bypass port 440, when selectably opened. In some implementations, the outlet passage 226 is disposed in a horizontal arrangement between the first outlet 212 and the third outlet 432, at the front of the filter head 200. In this implementation, the outlet passage is parallel to the first side 206, sixth side 442, third side 214, and fifth side 434. Further, at least a portion of the inlet passage is disposed in a horizontal arrangement between the first inlet 210 and the third inlet 430, at the rear of the filter head 200. In this implementation, the inlet passage 224 is parallel to the outlet passage 226. Additionally, in this implementation, the second inlet 216 and fourth inlet 436 form a fluid passage at a top portion of the body 202, which is substantially perpendicular to, and disposed above, the inlet passage 224 and outlet passage 226.

In some implementations, as shown by these examples, an example filter head 700 can provide for at least four different options for attachment of intake and outflow fluid lines to the filter head. As an illustrative example, FIGS. 7A, 7B, 7C, and 7D are component diagrams illustrating various views of various potential fluid line couplings to the filter head 700. With continued reference to FIGS. 2A-2C, and 4, FIG. 7A illustrates a front, left, top perspective view of one implementation of an example filter head 700 with two operably coupled fluid filters 750, 750'. This example illustrates a first operable implementation where an inlet fitting 702 can be coupled with a second inlet 716 on the front side; and an outlet fitting 704 can be coupled with a second outlet 718 on the front side.

Figure 7A:
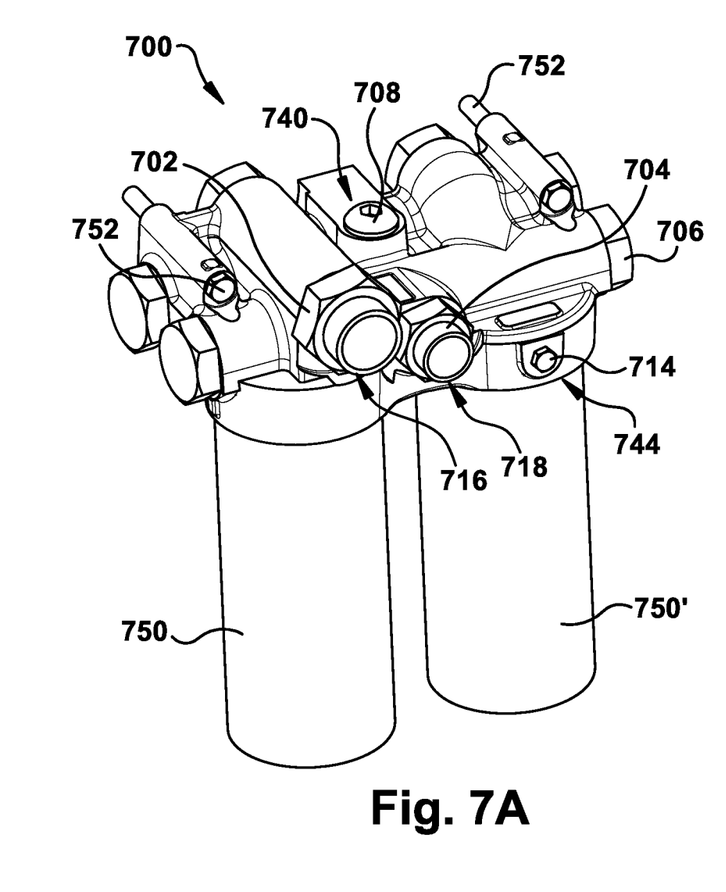
FIGS. 7A, 7B, 7C, and 7D are component diagrams illustrating various implementations of one or more portion of one or more systems described herein.

In this implementation, for example, an inlet hose can be operably coupled with the inlet fitting 702, and an outlet hose can be operably coupled with the outlet fitting 718, providing a first arrangement where the hoses are disposed at the front (e.g., third side 214). Further, the remaining inlets and outlets are operably closed with an inlet/outlet plug 706 to mitigate fluid leakage. Additionally, a bypass plug 708 (e.g., or valve) is operably disposed in the bypass port 740, to mitigate fluid flow between the inlet passage 224 and outlet passage 226, and to mitigate leakage out of the filter head 700. The bypass plug 708 can be selectably removed to allow flow between the inlet passage 224 and outlet passage 226. A sample port plug 714 is operably disposed in the sample port 744 to mitigate leakage of fluid from the inlet passage 224 to the outside. In this example, the sample port plug 714 can be selectably removed to access the sample port 744.

Figure 7B:
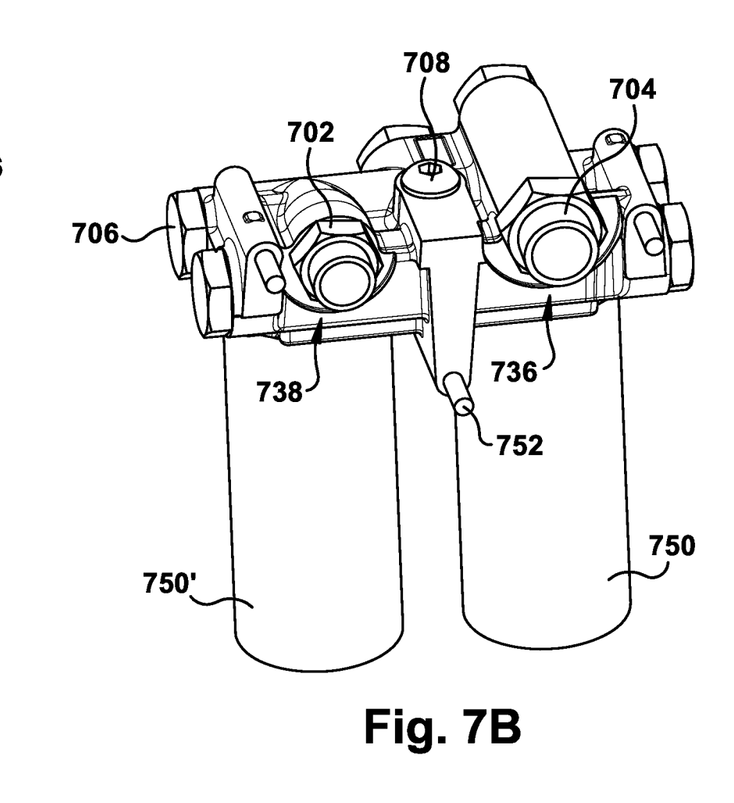

FIG. 7B illustrates a rear, right, top perspective view of a second operable implementation of the example filter head 700 with two coupled fluid filters 750, 750'. In this implementation, the inlet fitting 702 is coupled with a fourth inlet 736, and the outlet fitting 704 is coupled with a fourth outlet 438. As described above, these can be operably coupled with appropriate hoses to allow fluid to flow in and out of the filter head 700 in a second arrangement, where the hoses are coupled at the rear (e.g., fifth side 434). The remaining inlets and outlets can be fitted with inlet/outlet plugs 706 to mitigate leakage.

Figure 7C:
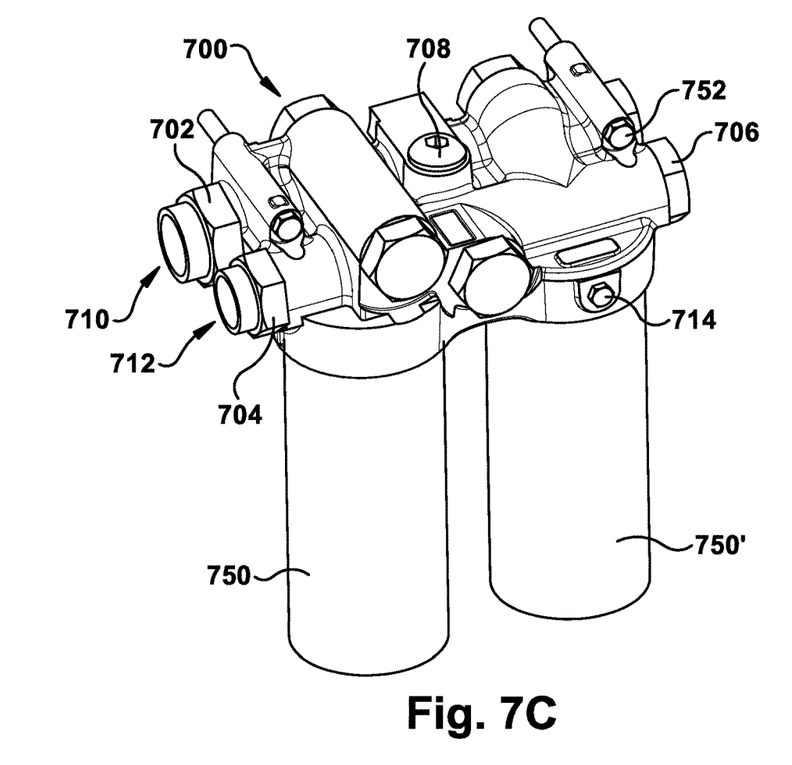

FIG. 7C illustrates a front, left, top perspective view of a third operable implementation of an example filter head 700 with two coupled fluid filters 750, 750'. In this implementation, the inlet fitting 702 is coupled with a first inlet 710, and the outlet fitting 704 is coupled with a first outlet 712. As described above, these can be operably coupled with appropriate hoses to allow fluid to flow in and out of the filter head 700 in a third arrangement, where the hoses are coupled at the left side (e.g., second side 208). The remaining inlets and outlets can be fitted with inlet/outlet plugs 706 to mitigate leakage.

Figure 7D:
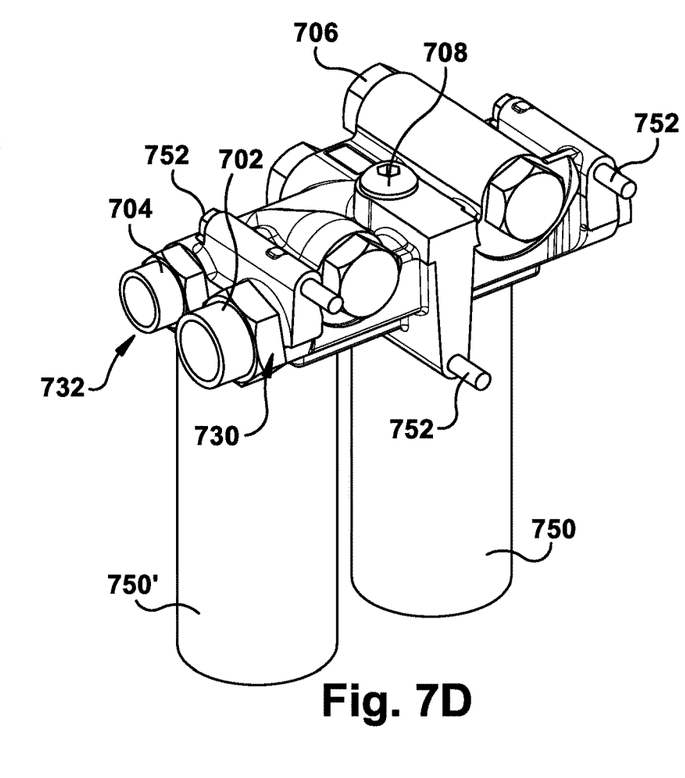

FIG. 7D illustrates a rear, right, top perspective view of a fourth operable implementation of an example filter head 700 with two coupled fluid filters 750, 750'. In this implementation, the inlet fitting 702 is coupled with a third inlet 730, and the outlet fitting 704 is coupled with a third outlet 732. As described above, these can be operably coupled with appropriate hoses to allow fluid to flow in and out of the filter head 700 in a fourth arrangement, where the hoses are coupled at the right side (e.g., fourth side 428). The remaining inlets and outlets can be fitted with inlet/outlet plugs 706 to mitigate leakage.

As illustrated in FIGS. 2A, 2B, 4, 5, and 7A-7D, a plurality of fastener receptacles 250 are disposed through the body 202. The respective fastener receptacles 250 are sized to receive a fastener 752, and to operably hold the filter head 200, 700 in place when fastened. As an example, the body can comprise a plurality of fastener receptacles to fasten the filter head to a support in a target vehicle. The number and arrangement of fastener receptacles can be selected using appropriate engineering principles for the target use.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A vehicle fluid filter head, comprising:
a body;
two filter headers disposed on a first side of the body, respective filter headers comprising an intake portion fluidly coupled with an inlet passage inside the body and an outflow portion fluidly coupled with an outlet passage inside the body, respective filter headers sized to operably engage with a fluid filter;
a first inlet fluidly coupled with the inlet passage, and a first outlet fluidly coupled with the outlet passage, and respectively disposed on a second side of the body, the second side orthogonal to the first side;
a second inlet fluidly coupled with the inlet passage, and a second outlet fluidly coupled with the outlet passage, and respectively disposed on a third side of the body, the third side orthogonal to the first side; and
a third inlet fluidly coupled with the inlet passage, and a third outlet fluidly coupled with the outlet passage, and respectively disposed on a fourth side of the body, the fourth side orthogonal to the first side and opposing the second side.

2. The filter head of claim 1, comprising a fourth inlet fluidly coupled with the inlet passage, and a fourth outlet fluidly coupled with the outlet passage, and respectively disposed on a fifth side of the body, the fifth side orthogonal to the first side and opposing the third side.

3. The filter head of claim 1, comprising a bypass port, the bypass port comprising an opening on a sixth side of the body that is fluidly coupled with the inlet passage and the outlet passage, wherein the sixth side is opposing the first side.

4. The filter head of claim 1, wherein the second side is opposing to the third side.

5. The filter head of claim 4, comprising a third inlet fluidly coupled with the inlet passage, and a third outlet fluidly coupled with the outlet passage, and respectively disposed on a fourth side of the body, the fourth side orthogonal to the first side and the second side.

6. The filter head of claim 5, comprising a fourth inlet fluidly coupled with the inlet passage, and a fourth outlet fluidly couple with the outlet passage, and respectively disposed on a fifth side of the body, the fifth side orthogonal to the first side and opposing the fourth side.

7. The filter head of claim 1, respective filter headers comprising a channel in the body disposed around the filter header and sized to operably receive an oil filter gasket.

8. The filter head of claim 1, comprising a sample port that is fluidly coupled through the body with the inlet passage, the sample port providing access to the interior of the body from the outside.

9. The filter head of claim 1, comprising a plurality of fastener receptacles disposed through the body and sized to receive a fastener and operably hold the filter head in place when fastened.

10. The filter head of claim 1, the outlet passage and inlet passage disposed parallel to each other in the body, the outlet passage disposed in a front portion of the body, and at least a portion of the inlet passage disposed in a rear of the body.

11. A vehicle fluid filter head, comprising:
a head body comprising an inlet passage and an outlet passage;
a first inlet and a second inlet, respective inlets disposed on different sides of the head, and respectively fluidly coupled with the inlet passage;
a first outlet and second outlet, respective outlets disposed on different sides of the head, and respectively fluidly coupled with the outlet passage;
two filter headers that each operably engage with a fluid filter, respective headers comprising an intake portion that is fluidly coupled with the inlet passage, and an outflow portion that is fluidly coupled with the outlet passage; and
a third inlet and third outlet, the third inlet and third outlet disposed on a different side of the filter head than the first inlet and second inlet.

12. The filter head of claim 11, comprising a fourth inlet and fourth outlet, the fourth inlet and fourth outlet disposed on a different side of the filter head than the first inlet, second inlet, and third inlet.

13. The filter head of claim 11, comprising a bypass port, the bypass port comprising an opening to the outside of the body that is fluidly coupled with the inlet passage and the outlet passage.

14. The filter head of claim 11, comprising a sample port that is fluidly coupled through the body with the inlet passage, the sample port providing access to the interior of the body from the outside.

15. The filter head of claim 11, comprising a plurality of fastener receptacles disposed through the body and sized to receive a fastener and operably hold the filter head in place when fastened.

16. The filter head of claim 11, the outlet passage and inlet passage disposed parallel to each other in the body, the outlet passage disposed in a front portion of the body, and at least a portion of the inlet passage disposed in a rear of the body.

17. A vehicle fluid filter head, comprising:
two filter headers disposed on a first side of filter head, respective filter headers comprising an intake portion and an outflow portion, and respective filter headers sized to operably engage with a fluid filter;
an inlet passage disposed inside the filter head, and fluidly coupled with the intake portion of respective filter headers;
an outlet passage disposed inside the filter head, and fluidly coupled with the outflow portion of respective filter headers;
a first inlet fluidly coupling the outside of the head with the inlet passage;
a first outlet fluidly coupling the outside of the head with the outlet passage, the first inlet and first outlet disposed on a same side of the head;
a second inlet fluidly coupling the outside of the head with the inlet passage; and
a second outlet fluidly coupling the outside of the head with the outlet passage, the second inlet and second outlet disposed on a different side of the head than the first inlet and first outlet; and
a third inlet and third outlet, the third inlet fluidly coupling the outside of the head to the inlet passage, and the third outlet fluidly coupling the outside of the head to the outlet passage, and the third inlet and third outlet disposed on a different side of the filter head than the first inlet and second inlet.

18. The filter head of claim 17, further comprising:
a fourth inlet and fourth outlet, the fourth inlet fluidly coupling the outside of the head to the inlet passage, and the fourth outlet fluidly coupling the outside of the head to the outlet passage, and the fourth inlet and fourth outlet disposed on a different side of the filter head than the first inlet, second inlet, and third inlet.

* * * * *